United States Patent
Suzuki et al.

(10) Patent No.: US 11,487,729 B2
(45) Date of Patent: Nov. 1, 2022

(54) DATA MANAGEMENT DEVICE, DATA MANAGEMENT METHOD, AND NON-TRANSITORY COMPUTER READABLE STORAGE MEDIUM

(71) Applicant: YAHOO JAPAN CORPORATION, Tokyo (JP)

(72) Inventors: Shuichi Suzuki, Tokyo (JP); Kouji Yamada, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 194 days.

(21) Appl. No.: 16/021,716

(22) Filed: Jun. 28, 2018

(65) Prior Publication Data
US 2019/0188289 A1    Jun. 20, 2019

(30) Foreign Application Priority Data
Dec. 18, 2017   (JP) .............................. JP2017-242030

(51) Int. Cl.
*G06F 17/30*   (2006.01)
*G06F 16/22*   (2019.01)
*G06F 16/25*   (2019.01)

(52) U.S. Cl.
CPC .......... *G06F 16/221* (2019.01); *G06F 16/258* (2019.01)

(58) Field of Classification Search
CPC .............................. G06F 16/258; G06F 16/221
USPC .......................................................... 707/741
See application file for complete search history.

(56) References Cited

U.S. PATENT DOCUMENTS

| | | | |
|---|---|---|---|
| 6,687,688 B1* | 2/2004 | Fujihara | G06F 16/2264 |
| | | | 707/999.102 |
| 9,442,980 B1* | 9/2016 | Trepetin | G06F 16/2455 |
| 2005/0050092 A1 | 3/2005 | Jain et al. | |
| 2006/0235818 A1* | 10/2006 | Muras | G06F 16/28 |
| 2013/0080484 A1* | 3/2013 | Kulack | G06F 16/211 |
| | | | 707/803 |
| 2014/0331084 A1* | 11/2014 | Sawazaki | G06F 11/2058 |
| | | | 714/6.23 |
| 2015/0186825 A1* | 7/2015 | Balasubramhanya | ....................... |
| | | | G06Q 10/06315 |
| | | | 705/7.25 |

(Continued)

FOREIGN PATENT DOCUMENTS

| | | |
|---|---|---|
| JP | 2013109364 A | 6/2013 |
| JP | 2016-099647 A | 5/2016 |

(Continued)

OTHER PUBLICATIONS

Kato, et al. "Light and Fast!—How to make a system to analyze big data". Nikkei Systems, Sep. 26, 2013, No. 246/ Oct. 2013 edition, pp. 42 to 59.

(Continued)

*Primary Examiner* — Usmaan Saeed
*Assistant Examiner* — Earl Elias
(74) *Attorney, Agent, or Firm* — Oliff PLC (57) ABSTRACT

A data management device is provided, which includes an interpreting unit that interprets an input record, and convert the input record to abstract expression by which a correspondence relation between a data item and data itself is recognizable; and a converting unit that stores, in a storage unit, a data set, in which the data itself and index information capable of identifying the record are associated, as column data for each of the data items.

9 Claims, 11 Drawing Sheets

(56) References Cited

U.S. PATENT DOCUMENTS

| | | | |
|---|---|---|---|
| 2017/0024194 A1* | 1/2017 | Sevenich | G06F 8/443 |
| 2017/0255662 A1* | 9/2017 | Scherrer | G06F 16/221 |
| 2018/0262864 A1* | 9/2018 | Reynolds | H04L 67/303 |

FOREIGN PATENT DOCUMENTS

| | | |
|---|---|---|
| JP | 2016-519810 A | 7/2016 |
| JP | 2017-167917 A | 9/2017 |

OTHER PUBLICATIONS

Jan. 15, 2019 Office Action issued in Japanese Patent Application No. 2017-242030.

\* cited by examiner

FIG.1

```
{
  "name": "Paul"
 , "age": 19
}
```

```
{
    "debut": 1960,
    "members": [
        {
            "age": 19
            "name": "Paul"
        },
        {
            "age": 19
            "name": "John"
        }
    ],
    "name": "Group1"
}
```

{"name, string": "Mark", "age, int": 30}

| name, string | age, int |
|---|---|
| Mark | 30 |

|  | sex | age | job | hobby |
|---|---|---|---|---|
| (RECORD 1) | sex (1) | null | null | null |
| (RECORD 2) | null | age (2) | null | null |
| (RECORD 3) | null | null | null | null |
| (RECORD 4) | null | age (4) | job (4) | null |
| (RECORD 5) | sex (5) | null | null | null |
| (RECORD 6) | null | null | job (6) | null |

FIG.14

DATA MANAGEMENT DEVICE, DATA MANAGEMENT METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2017-242030 filed in Japan on Dec. 18, 2017.

BACKGROUND OF THE INVENTION

1. Field of the Invention

The present invention relates to a data management device, a data management method, and a non-transitory computer readable storage medium having stored therein a data management program.

2. Description of the Related Art

Conventionally, a method for detecting names in languages used in China, Japan, and Korea has been known (see Japanese Laid-open Patent Publication No. 2013-109364). In this method, structured data is handled.

Incidentally, a row-oriented data structure and a column-oriented data structure are known as data structures used in databases. The row-oriented data structure is a data structure for holding a single record as a set of logical structures. In contrast, the column-oriented data structure is known. The column-oriented data structure is a data structure for holding pieces of data corresponding to the same index (in a case of user attribute data, a name, an age, a gender, or the like) as a set of logical structures. The logical structure is a key, logical block addressing (LBA), a label in a logical-to-physical conversion table, and other kinds of logical information, each of which is used for searching for data. The row-oriented data structure is easy to use for adding and deleting data, whereas the column-oriented data structure is suitable for statistical processing with respect to each index.

Incidentally, a function, such as JSON, that handles the row-oriented data structure makes it possible to automatically generate a data tree structure, but it costs a lot in terms of a network, a storage device, and software processing. In particular, a long processing time is needed to read data for statistical processing from a database that has the column-oriented data structure.

In contrast, when data is stored using the column-oriented data structure, it is difficult to manage all of indexes that can be adopted, and it is difficult to add and delete data. In particular, when data is input using a stream format, it is expected to process data for each record, but it is impossible to directly write data in a column-oriented system (e.g., columnar database management system) from the process performed on each record. Further, in the column-oriented system, effective methods for managing a write failure and eliminating redundancy have not been developed.

SUMMARY OF THE INVENTION

It is an object of the present invention to at least partially solve the problems in the conventional technology.

According to one aspect of an embodiment, a data management device includes an interpreting unit that interprets an input record, and convert the input record to abstract expression by which a correspondence relation between a data item and data itself is recognizable, and a converting unit that stores, in a storage unit, a data set, in which the data itself and index information capable of identifying the record are associated, as column data for each of the data items.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of a data management device, a data management method, and a non-transitory computer readable storage medium having stored therein a data management program according to the present application will be described below with reference to the drawings. The data management device is a device that stores data received from a client in a storage device, reads data from the storage device in response to a request from the client that has transmitted the data or a different client, and provides the read data to the client. The data management device may be referred to as a database management system (DBMS). The client includes an application server (hereinafter, referred to as a front-end server) that operates in cooperation with an application program that is executed in a terminal device used by an end user, a data user server that uses accumulated data as statistical data, and the like.

Figure 1:
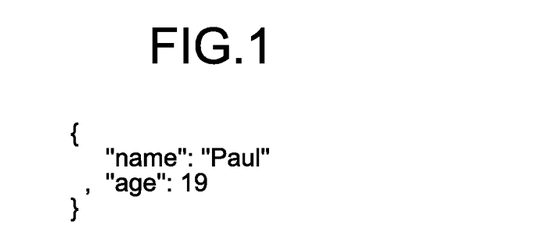
FIG. 1 is a diagram illustrating an example of a log in the JSON format.
Figure 2:
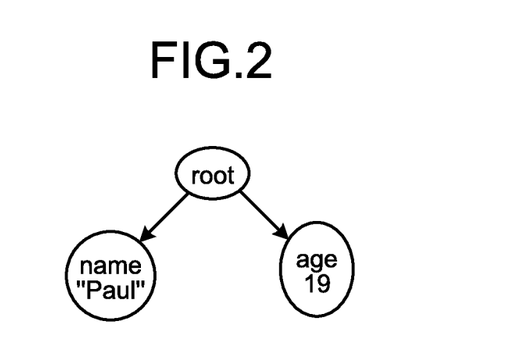
FIG. 2 is a diagram illustrating the log in FIG. 1 using a tree structure.
Figure 3:
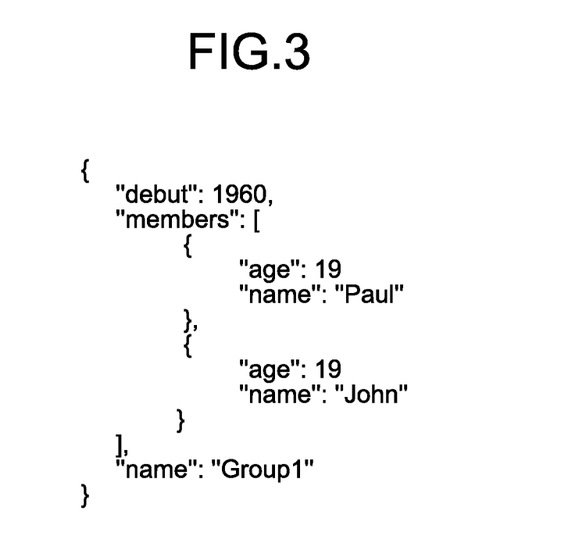
FIG. 3 is a diagram illustrating another example of the log in the JSON format.

First, a conceptual aspect of the present application will be described. In recent Hadoop, a Hadoop distributed file system (HDFS) is accessed using "SQL-on-Hadoop", which is represented by Hive or Presto, in a manner like a relational database (RDB), and there are few cases in which a file including "a large amount of non-structural data" is directly handled, unlike what was expected in the past. In contrast, almost all pieces of data to be stored are non-structural "logs" when they are acquired. Therefore, in many cases, data is acquired and processed as "non-structural regular data". The "non-structural regular data" is represented by JSON and XML, which are described in a "nested key-value format" and viewed as a tree structure. FIG. 1 is a diagram illustrating an example of a log in the JSON format, and FIG. 2 is a diagram illustrating the log in FIG. 1 using a tree structure. Expression using the tree structure is suitable for abstraction of the "nested key-value format". FIG. 3 is a diagram illustrating another example of a log in the JSON format, and FIG. 4 is a diagram illustrating the log in FIG. 3 using a tree structure.

Figure 4:
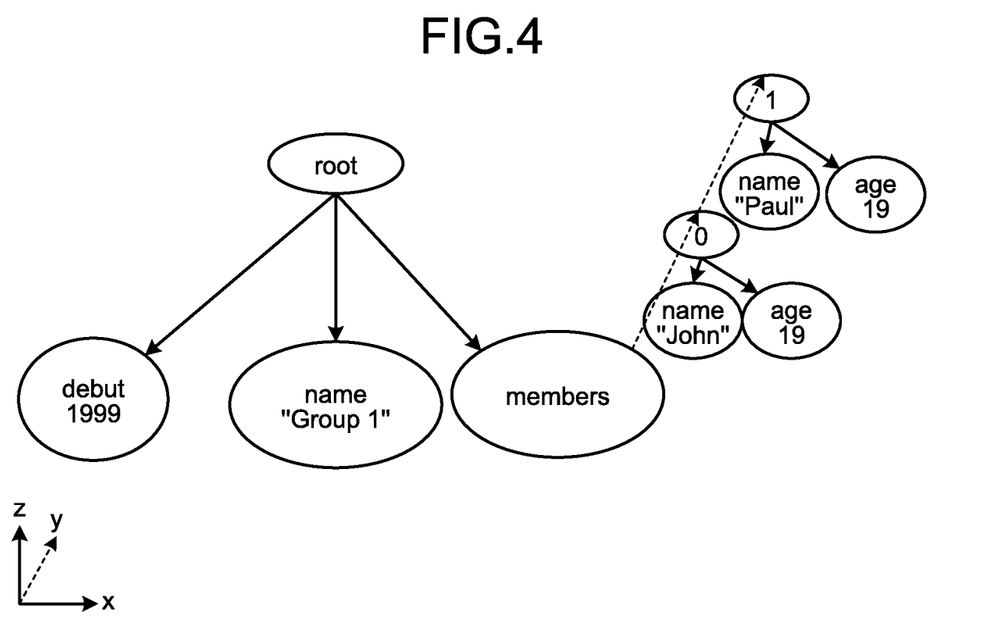
FIG. 4 is a diagram illustrating the log in FIG. 3 using a tree structure.

As illustrated in FIG. 4, a "nested key-value" can extend a dimension of array in the y-direction on the (x, z) plane, and a tree structure in a multidimensional space is suitable to express the "nested key-value format", that is, a schema. "schemaobject" is an object that is obtained by separating and abstracting the "tree structure in the multidimensional space" from a data format (JSON, XML, Avro, Message-Pack, or the like).

Figure 5:
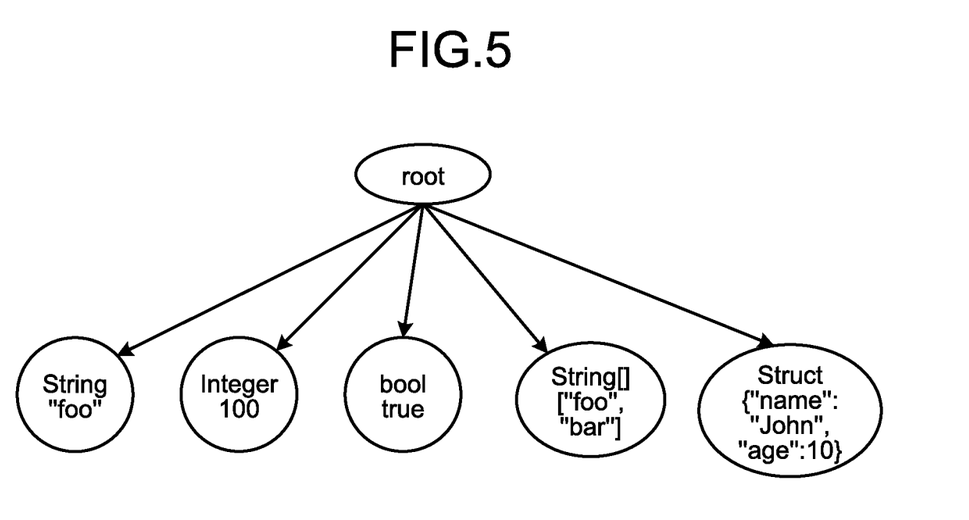
FIG. 5 is a diagram illustrating data of a columnar file using a tree structure.

In contrast, a distributed storage represented by Hadoop has been originally designed and developed primarily for the purpose of accessing a large amount of non-structural data with high throughput and high latency; however, in recent years, there are increasing cases in which data is structured and arranged in order to realize high throughput and low latency. When data is structured in the HDFS, a file format called columnar, in which data can be made persistent like an RDB, is generally used. Representative examples of the columnar include a hive optimized row columnar (ORC) file and Apache Parquet. When data in the columnar file is expressed using a tree structure, data is represented by a "two-dimensional tree with one layer just below the root" as illustrated in FIG. 5. FIG. 5 is a diagram illustrating data of a columnar file using the tree structure.

The columnar file format has a competitive advantage in that "cost can be reduced because of access for each column" over other non-structural data file formats that are familiar in Hadoop, in every point of view, such as a memory, a CPU, and IO. In contrast, the columnar file has a disadvantage in that "it forces data structuring". As described above, data is a non-structural "log" when the data is acquired, and it is impossible to express data in a sophisticated manner, such as a "multidimensional tree structure", even when the data is to be structured.

To solve the problem as described above, a method adopted in the present application has been conceived. That is, a file format is conceived, in which data of multidimensional varieties (in a depth direction in the tree structure) can be made persistent. In this format, schemaobject described above is written without any change, so that it is possible to hold data while maintaining expression of a "nested key-value array".

In general, the disadvantage of the data columnar file format is "data structuring", and logic and processing for performing dimensional compression to compress multidimensional data to two-dimensional data need to be implemented in a certain stage, that is, what is called a "schema" is needed. To manage and change the schema, a large cost is needed. In the method of the present application, the dimensional compression processing is not needed, so that a "problem with the scheme" in storing data can be cleared. Further, there is a large advantage in that it is possible to access an array and a "specific value" of a Struct type without expanding all columns, while such access is not possible using a columnar file because of the structural point of view.

Figure 6:
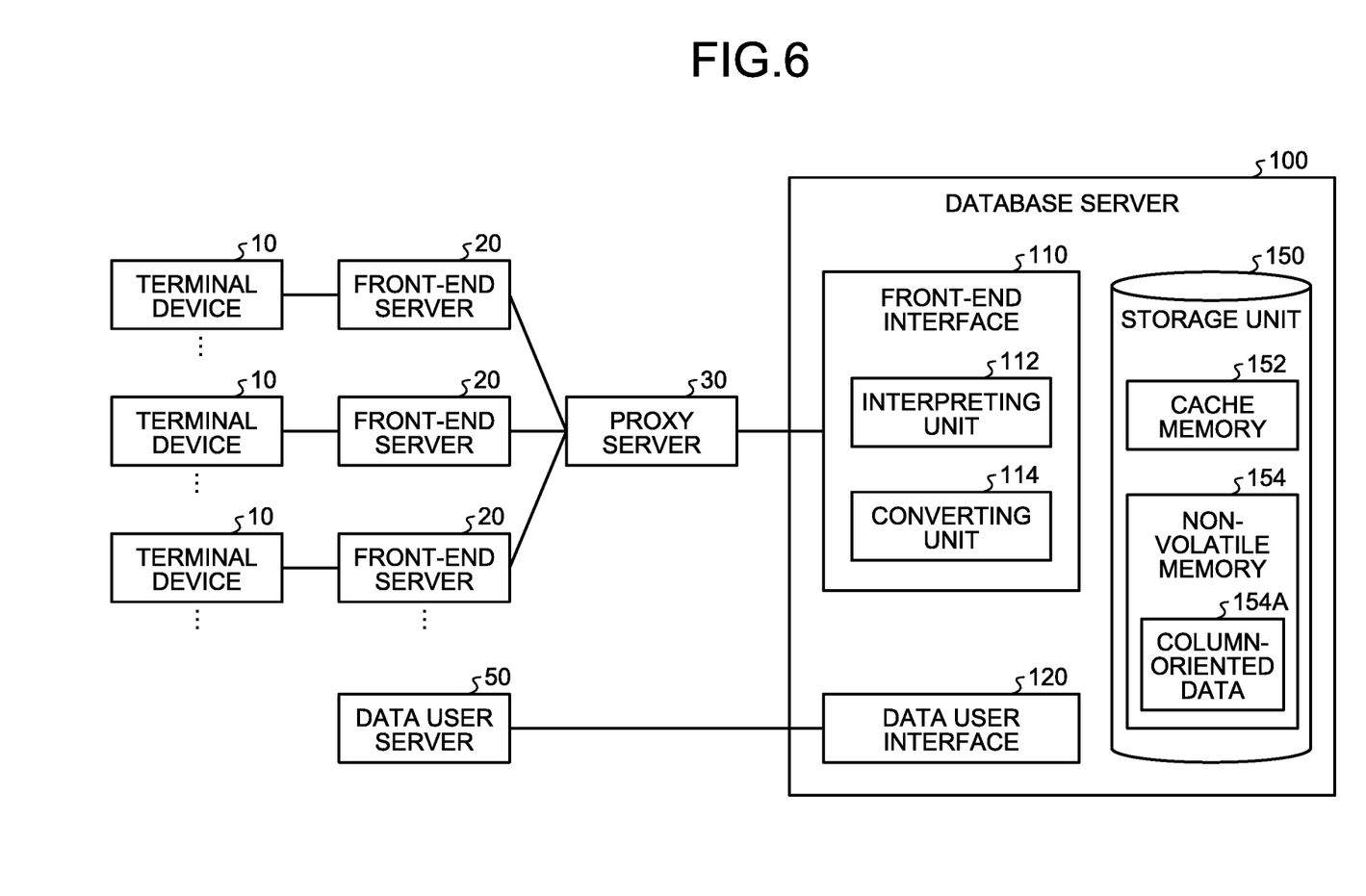
FIG. 6 is a diagram illustrating an example of a usage environment and a configuration of a database server 100 that is an example of a data management device.

A configuration and a function will be described in detail below. FIG. 6 is a diagram illustrating an example of a usage environment and a configuration of a database server 100 that is one example of the data management device. One or more terminal devices 10 used by end users communicate with a front-end server 20. In each of the terminal devices 10, an application program operates and data that is needed to execute the application program is transmitted to and received from the front-end server 20. The front-end server 20 transmits pieces of data, which are needed to be stored among pieces of data acquired from the terminal devices 10, to the database server 100 via a proxy server 30, and the pieces of data are stored in the database server 100. The front-end server 20 reads data that is needed to execute the application programs from the database server 100, and transmits the read data to the terminal devices 10. A plurality of combinations of the one or more terminal devices 10 and the front-end server 20 are provided. Each of the front-end servers 20 issues a data write request and a data read request to the database server 100 in an arbitrary format such as JavaScript (registered trademark) Object Notation (JSON) or MySQL.

Meanwhile, a data user server 50 acquires, from the database server 100, a piece of data that is permitted to be used in a statistical process based on terms of services among pieces of data collected from the front-end servers 20. The front-end server 20 and the data user server 50 need not be strictly distinguished, but a part of the front-end server 20 may operate as the data user server 50 in some cases. Further, the data user server 50 may communicate with the database server 100 via the proxy server 30. All of the devices illustrated in FIG. 6 are communicably connected to one another via a network, such as the Internet, a wide area network (WAN), or a local area network (LAN).

The database server 100 includes, for example, a front-end interface 110, a data user interface 120, and a storage unit 150, in addition to a communication interface (not illustrated), such as a network interface card (NIC). The front-end interface 110 and the data user interface 120 are implemented by causing a processor, such as a central processing unit (CPU), to execute a program (software). Further, one or both of these functional units may be implemented by hardware, such as a large scale integration (LSI), an application specific integrated circuit (ASIC), or a field-programmable gate array (FPGA), or may be implemented by cooperation of software and hardware.

The front-end interface 110 includes, for example, an interpreting unit 112 and a converting unit 114. The interpreting unit 112 abstracts data acquired from the front-end server 20. Further, when providing data to the front-end server 20, the interpreting unit 112 converts the abstracted data to a format compatible with the front-end server 20. The converting unit 114 converts row-oriented data to column-oriented data, and stores the data in the storage unit 150. The data user interface 120 reads, from the storage unit 150, data in response to a request from the data user server 50, and transmits the read data to the data user server 50. Details of the above-described functions will be described later.

The storage unit 150 includes, for example, a cache memory 152 and a non-volatile memory 154. The cache memory 152 is implemented by a random access memory (RAM), a register, a flash memory, or the like. The non-volatile memory 154 is implemented by a hard disk drive (HDD), a flash memory, or the like. The non-volatile memory 154 stores therein column-oriented data 154A. The storage unit 150 may be a network attached storage (NAS) that can be accessed by the database server 100 via a network.

Front-end Interface

Figure 7:
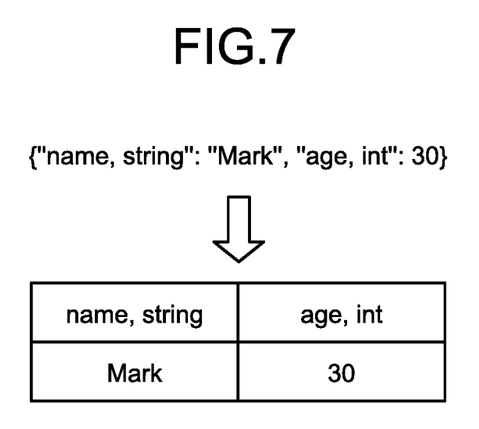
FIG. 7 is a diagram for explaining a function of an interpreting unit 112.

A function of the front-end interface 110 will be described below. The interpreting unit 112 of the front-end interface 110 converts pieces of data, which are defined differently for each of the front-end servers 20, into a single common format. FIG. 7 is a diagram for explaining the function of the interpreting unit 112. Here, data is described, which indicates that an age of a user with a user name (name) of Mark is 30. In the lower part of FIG. 7, abstracted data that can be handled by the database server 100 is schematically illustrated. As illustrated in FIG. 7, the interpreting unit 112 interprets a data storage request acquired from the front-end server 20, performs an abstraction process, and sends the data to the converting unit 114. Meanwhile, string and int are data formats to be described later.

The abstracted data obtained by the front-end interface 110 generally has a row-oriented data structure, unless subjected to a specific process. The converting unit 114 further converts the abstracted data to a column-oriented data structure, and stores the data as the column-oriented data 154A in the non-volatile memory 154 of the storage unit 150.

Figure 8:
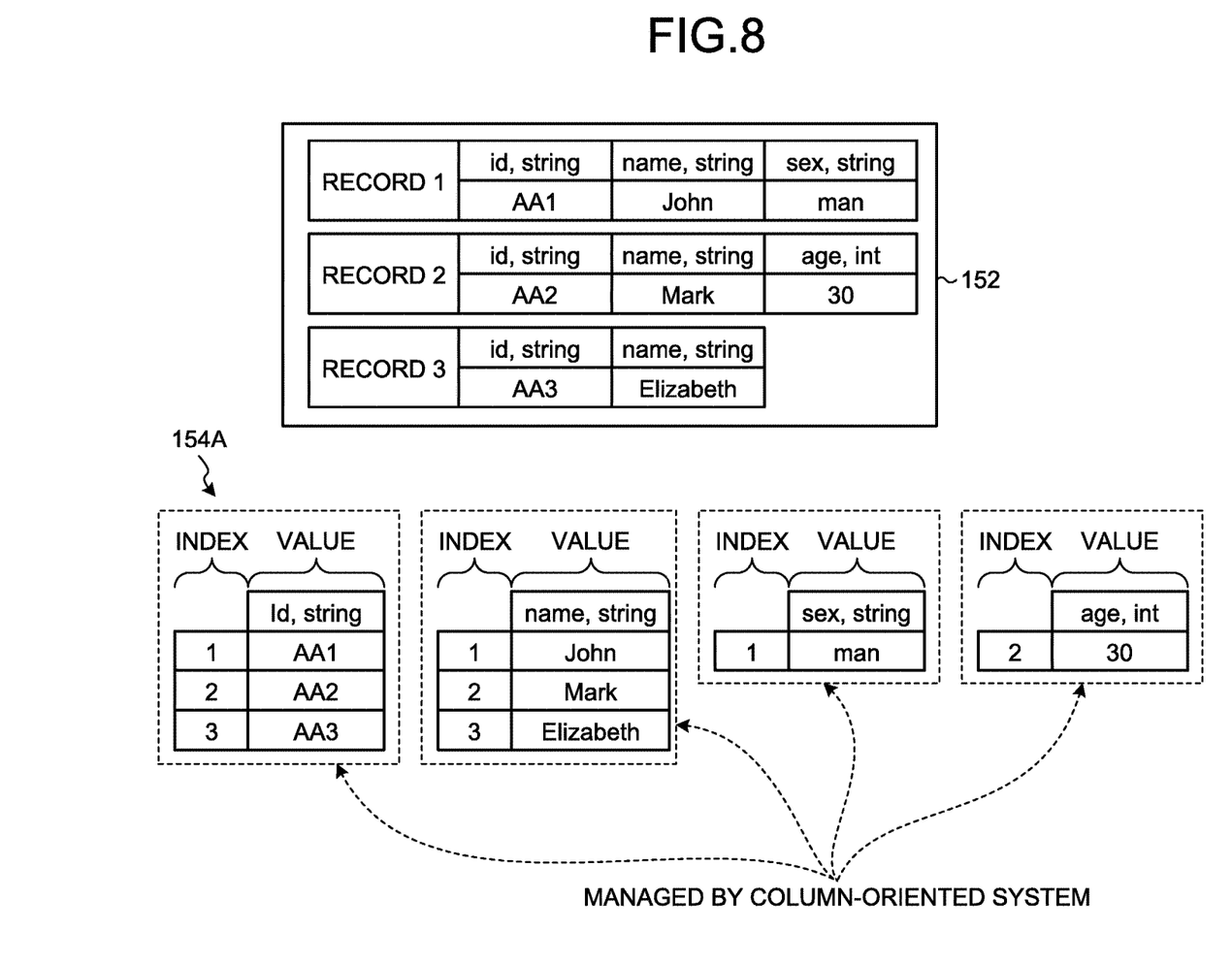
FIG. 8 is a first diagram for explaining a function of a converting unit 114.

FIG. 8 is a first diagram for explaining a function of the converting unit 114. Here, it is assumed that three records such as a record 1 to a record 3 are acquired from the front-end server 20, and abstracted by the interpreting unit 112. The record 1 includes an id (identification information), a name (user name), and sex (gender), as data items. Further, the record 2 includes an id, a name, and an age as data items, and the record 3 includes an id and a name as data items. These abstracted records are stored in the cache memory 152 in association with record numbers, for example.

When a certain amount of data is stored in the cache memory 152, the converting unit 114 stores the data in the non-volatile memory 154 while managing the data using a column-oriented data structure in which an array is not reserved in advance. In the column-oriented data structure, a single data unit (hereinafter, a data set) includes a combination of Index and Value. Index and Value included in the data set are stored in the non-volatile memory 154 in association with each other. The condition "in association with each other" indicates that, for example, pieces of address information indicating storage locations are written in a consecutive manner in a memory space or written at positions that can be tracked by a pointer. This mode of storing the data set corresponds to storing schemaobject, which is an object that is obtained by separating and abstracting the "tree structure in the multidimensional space" from a data format (JSON, XML, Avro, MessagePack, or the like), in the memory space without any change.

Index is information (in other words, offset information) that indicates the order of a record from which Value, i.e., data itself, is extracted in a subject table (a management unit larger than a data unit). Index is one example of "index information". The data sets with the same data item are stored at close positions in terms of a logical structure in the non-volatile memory 154. The "close positions in terms of a logical structure" indicates that, for example, when a certain data set is referred to and thereafter a next data set is to be referred to, the next data set can be referred to by only referring to a consecutive address in the memory space or by only tracking one or a small number of pointers.

In the following, one or more data sets with the same data item, i.e., one or more data sets managed by the column-oriented system (e.g., columnar database management system), will be referred to as column data. In the example in FIG. 8, each of datasets, such as a data set including the records 1, 2, and 3 with respect to the data item "id", a data set including the records 1, 2, and 3 with respect to the data item "name", a data set including the record 1 with respect to the data item "sex", and a data set including the record 2 with respect to the data item "age", is managed as column data.

Further, a header, in which a data type of the data item or the like is written, is added to the column data. Examples of the data type include, [string (text)], [int (integer)], [long (long integer)], [float (floating-point expression)], and [double (double-precision floating-point expression)].

When a request for further storing a different record is acquired, the converting unit 114 manages the data using the following methods. That is, the converting unit 114 may manage data by adding the data in a data structure that has already been managed (first method), or sort data to be managed every time data is moved from the cache memory 152 to the non-volatile memory 154 (second method). In the following, the first method will be described. When the second method is adopted, a data combining process is appropriately performed when data is read.

Figure 9:
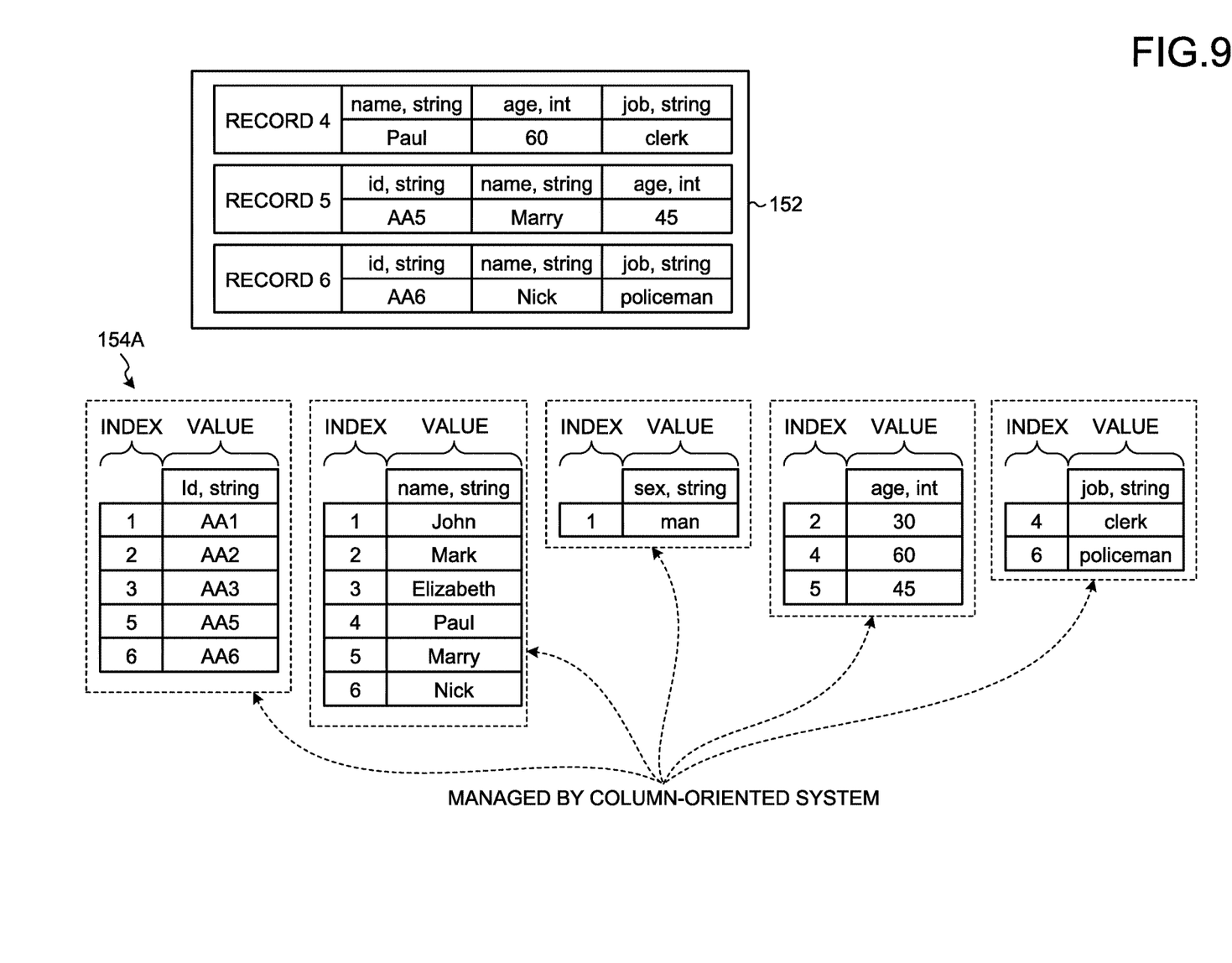
FIG. 9 is a second diagram for explaining the function of the converting unit 114.

FIG. 9 is a second diagram for explaining the function of the converting unit 114. Here, it is assumed that three records such as a record 4 to a record 6 are further acquired from the front-end server 20 and abstracted by the interpreting unit 112. The record 4 includes a name, an age, and a job as data items. Further, the record 5 includes an id, a name, and an age as data items, and the record 6 includes an id, a name, and a job as data items. These abstracted records are stored in the cache memory 152.

When a certain amount of data is stored in the cache memory 152, the converting unit 114 stores the data in the non-volatile memory 154 while managing the data using a column-oriented data structure. Here, the records 4 to 6 include the data item of job (occupation) that is not included in the records 1 to 3. In this case, the converting unit 114 sets new column data and manages the data. In the example in FIG. 9, each of data sets, such as a data set including the records 1, 2, 3, 5, and 6 with respect to the data item "id", a data set including the records 1, 2, 3, 4, 5, and 6 with respect to the data item "name", a data set including the record 1 with respect to the data item "sex", a data set including the records 2, 4, and 5 with respect to the data item "age", and a data set including the records 4 and 6 with respect to the data item "job", is managed as column data.

By managing the data as described above, for example, when a request to "acquire jobs of all of users" is acquired from the data user server 50, the database server 100 (the data user interface 120) can read the column data of the data item "job" without referring to the column data of the other data items (an id, a name, an age, sex, and the like). Therefore, it becomes possible to reduce time taken to read data, and promptly respond to the need for data use. When an HDD is used as the non-volatile memory 154, for example, it is preferable to hold a set of logical structures in the same track in order to reduce a seek time, but the embodiment is not limited to this example.

Further, for example, the database server 100 (the data user interface 120) can receive a request to read, from the storage unit 150, Index (information capable of identifying a record) for which Value (data itself) of a predetermined data item meets a setting condition, and return a result. Specifically, when a request "to acquire records for which Value of age is 45 or larger" is acquired from the data user server 50, it is possible to read Index included in the column data of the data item "age" without referring to the other data items (an id, a name, sex, a job, and the like). In this case, the database server 100 (the data user interface 120) sequentially reads data sets from the column data of "age", and extracts Index of a data set in which a value indicated by Value is 45 or larger. The extracted Index is a number added to the record in which "age" is 45 or larger, and therefore, for example, the database server 100 can search for data for each of records that are stored separately from the column-oriented data 154A and acquire the record in which "age" is 45 or larger. In the example in FIG. 9, the data sets with the Index of 4 and 5 meet the condition, and the database server 100 extracts the fourth record and the fifth record.

Furthermore, as illustrated in FIG. 8 and FIG. 9, even when values of Index are not consecutive in the column direction, the converting unit 114 does not provide a blank memory area between data sets that have non-consecutive values in Index. With this configuration, the database server 100 can omit a process of skipping the memory area when reading data, so that it is possible to improve a processing speed. Further, in the present embodiment, Index and Value included in the data set are stored in the non-volatile memory 154 in an associated manner, so that even a data set that is not related to a pre-set data item can be added to the column-oriented data 154A. That is, it is possible to freely add the data item at an arbitrary timing.

Figure 10:
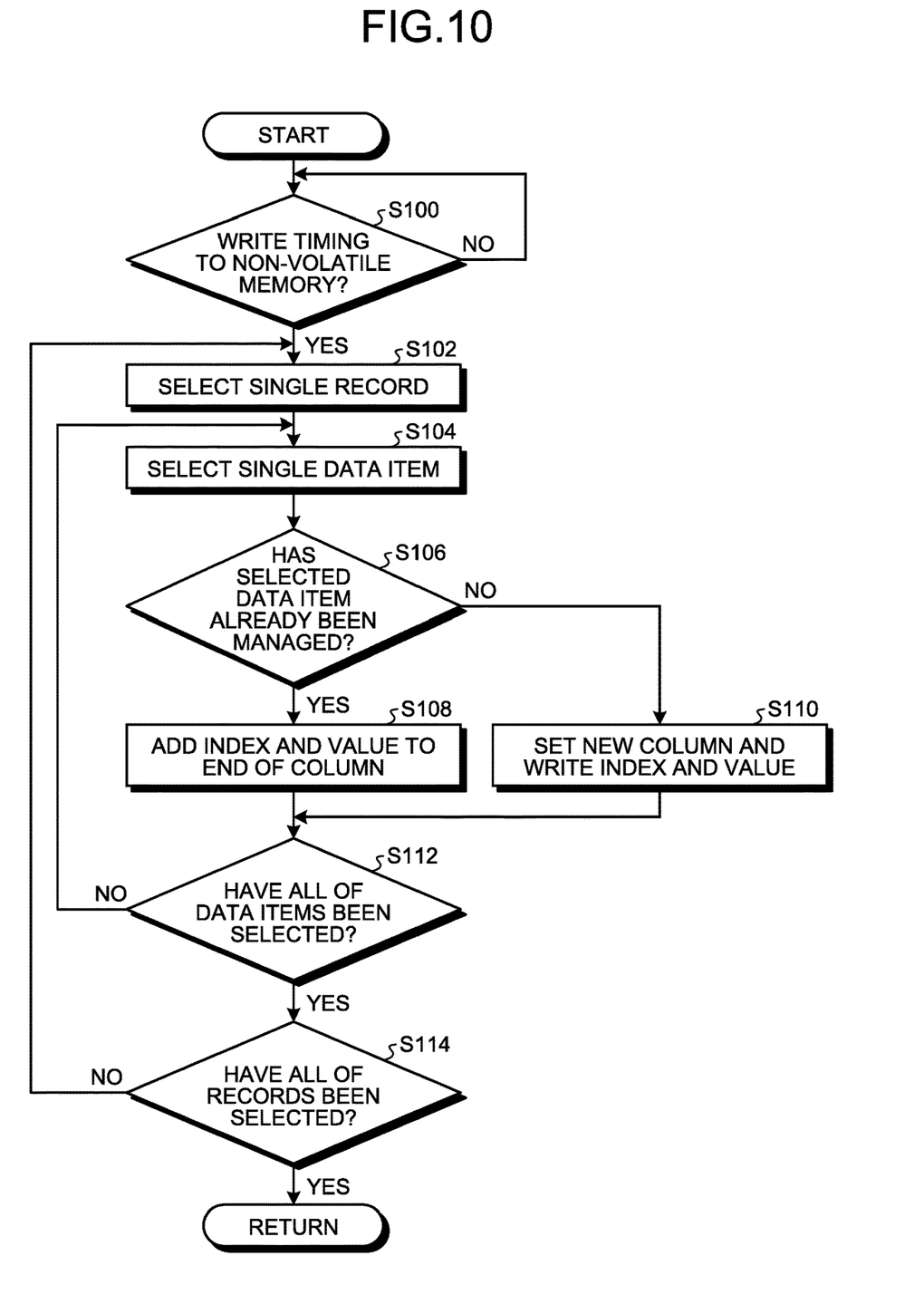
FIG. 10 is a flowchart illustrating an example of a process performed by the converting unit 114.

FIG. 10 is a flowchart illustrating an example of the flow of a process performed by the converting unit 114. First, the converting unit 114 waits until a write timing to the non-volatile memory 154 comes (S100). The write timing to the non-volatile memory 154 can be defined as an arbitrary timing, such as a timing at which a certain amount of data is stored in the cache memory 152 as described above, a timing at which the database server 100 is shut down, or a timing at which a process for aggregating data up to the latest data is requested.

If the write timing to the non-volatile memory 154 comes, the converting unit 114 selects a single record stored in the cache memory 152 (S102), and selects a single data item included in the selected record (S104). Then, the converting unit 114 determines whether the selected data item is a data item that has already been managed (S106).

If the selected data item has already been managed, the converting unit 114 adds Index and Value at the end of the data item (S108). In other words, if the selected data item is a data item that has already been managed, the converting unit 114 adds Index and Value at the end of the data item. In contrast, if the selected data item is not the data item that has already been managed, the converting unit 114 newly sets (defines) a column and write Index and Value in the set column (S110).

Next, the converting unit 114 determines whether all of the data items of the selected record have been selected (S112). If all of the data items of the selected record have not been selected, the process returns to S104. If all of the data items of the selected record have been selected, the converting unit 114 determines whether all of the records stored in the cache memory 152 have been selected (S114). If all of the records stored in the cache memory 152 have not been selected, the process returns to S102. If all of the records stored in the cache memory 152 have been selected, the process of one routine in the flowchart is terminated.

[Extended Function]

Figure 11:
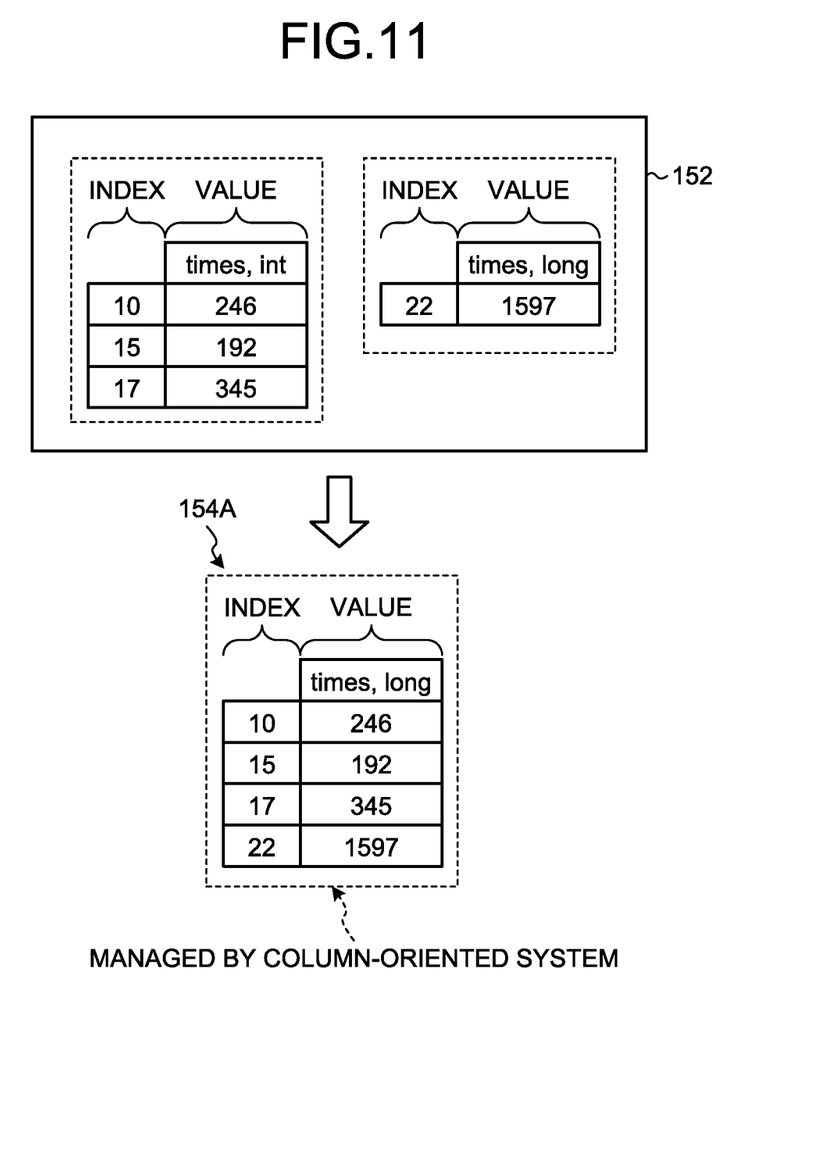
FIG. 11 is a diagram for explaining a cast function of the converting unit 114.

When pieces of data in certain formats that are different but can be integrated are input with respect to the same data item, the converting unit 114 may cast the pieces of data as a single piece of column data. The data formats that can be integrated are, for example, a combination of int (integer) and long (long integer) or a combination of float (floating-point expression) and double (double-precision floating-point expression). The converting unit 114 reconstructs a single piece of column data with respect to two or more pieces of column data, which are defined by different numerical data formats and which correspond to the same data item, by adopting the data format of the longer numerical data between the data formats at a desired timing.

FIG. 11 is a diagram for explaining the cast function of the converting unit 114. For example, in a case of a data item such as "times (login times)", when data is input using a data format [int] for records 10, 15, and 17 and data is input using a data format [long] for a record 22 because digits in Value are long, two pieces of column data are separately set at the initial time as illustrated in the upper part of FIG. 11. In this case, the converting unit 114 integrates the data formats by changing a data format of the data set for the data item [int] to [long] at an arbitrary timing. With this operation, it is possible to effectively perform statistical processing, such as a process for obtaining a sum, with respect to data sets in different data formats.

Figure 12:
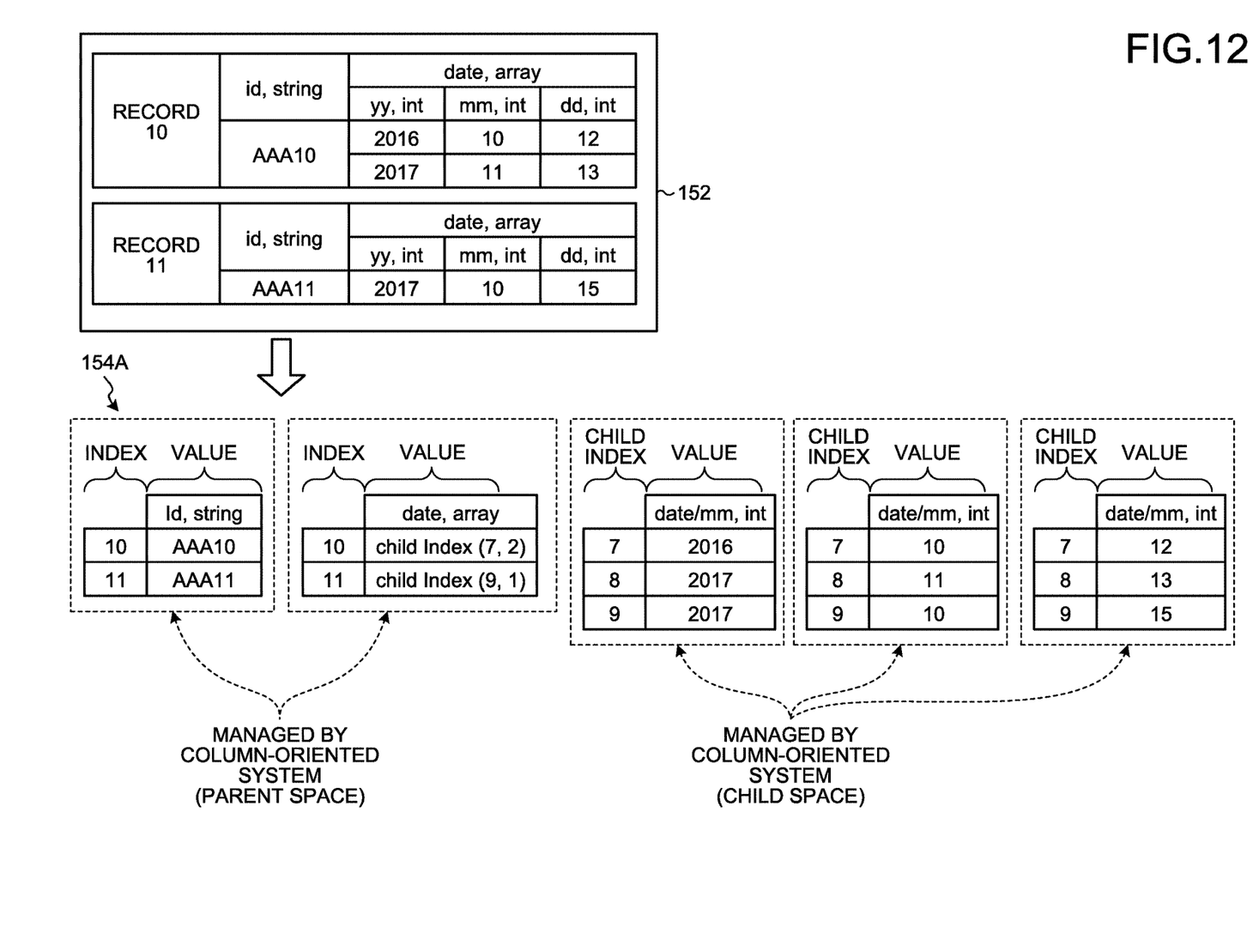
FIG. 12 is a diagram for explaining a data dividing function of the converting unit 114.

When [array] is designated as a data format for example, the converting unit 114 divides a plurality of data items and generates pieces of column data. That is, when an input record includes a hierarchical structure, the converting unit 114 expands the hierarchical structure in a memory space formed by the column data and stores the hierarchical structure in the storage unit 150. FIG. 12 is a diagram for explaining a data dividing function of the converting unit 114. As illustrated in FIG. 12, the converting unit 114 adopts each of "yy", "mm", and "dd" included in "date" in the data format [array] as a data item, and manages the data as column data using a column-oriented system (e.g., columnar database management system) in a memory space (child space (lower space)) that is different from a parent space (upper space). In this case, the converting unit 114 stores a top value of ChildIndex, which is offset information in the child space, and length (a value that indicates the last column including target data), in Value of the column data corresponding to [array] in the parent space. In the example in FIG. 12, "ChildIndex(7, 2)", which is stored in Value of a data set identified by Index of 10 with respect to the data item of "date" in the parent space, indicates that data sets with ChildIndex of 7 and 8 in the child space are handled as corresponding data sets. Further, the converting unit 114 adds information indicating that the data is derived from [array] to the column data in the child space. With this configuration, it becomes possible to manage a piece of input data (having a hierarchical structure), which originally has a larger number of dimensions than other data items, in a flat data structure.

[Data User Interface]

Figure 13:
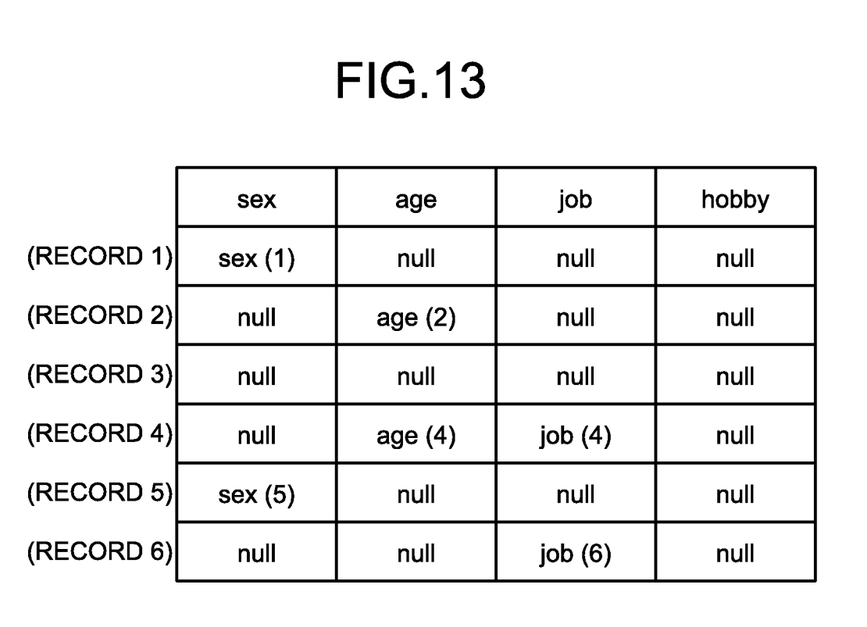
FIG. 13 is a diagram illustrating an image of data output from a data user interface 120.

A function of the data user interface 120 will be described below. The data user interface 120 provides data in a table format (array data) in response to a request from the data user server 50, for example. The request from the data user server 50 is issued with designation of an arbitrary data item. In this case, the data user interface 120 generates data in a table format, in which "null" (or any mode, such as blank, indicating that "target data is absent") is set for a piece of data corresponding to the designated item in a record that does not include the designated data item, and provides the data in the table format to the data user server 50. Further, when the designated data item is not present among data items that have already been managed, the data user interface 120 generates data in a table format, in which "null" (or any mode, such as blank, indicating that "target data is absent") is set for all pieces of data corresponding to the designated data item, and provides the data in the table format to the data user server 50 rather than returning an error. The request from the data user server 50 may be issued by designating a predetermined extension, for example.

For example, it is assumed that a data request with designation of data items [sex, age, job, and hobby] is issued while data as illustrated in FIG. 9 is stored as the column-oriented data 154A in the non-volatile memory 154. An image of data output from the data user interface 120 in this case is illustrated in FIG. 13. FIG. 13 is a diagram illustrating the image of data output from the data user interface 120. As illustrated in FIG. 13, the data output from the data user interface 120 is data represented by an array, in which pieces of data are arrayed for each record and each data item regardless of presence or absence of data. With this configuration, the database server 100 can provide data in a format depending on the need of the data user server 50.

Figure 14:
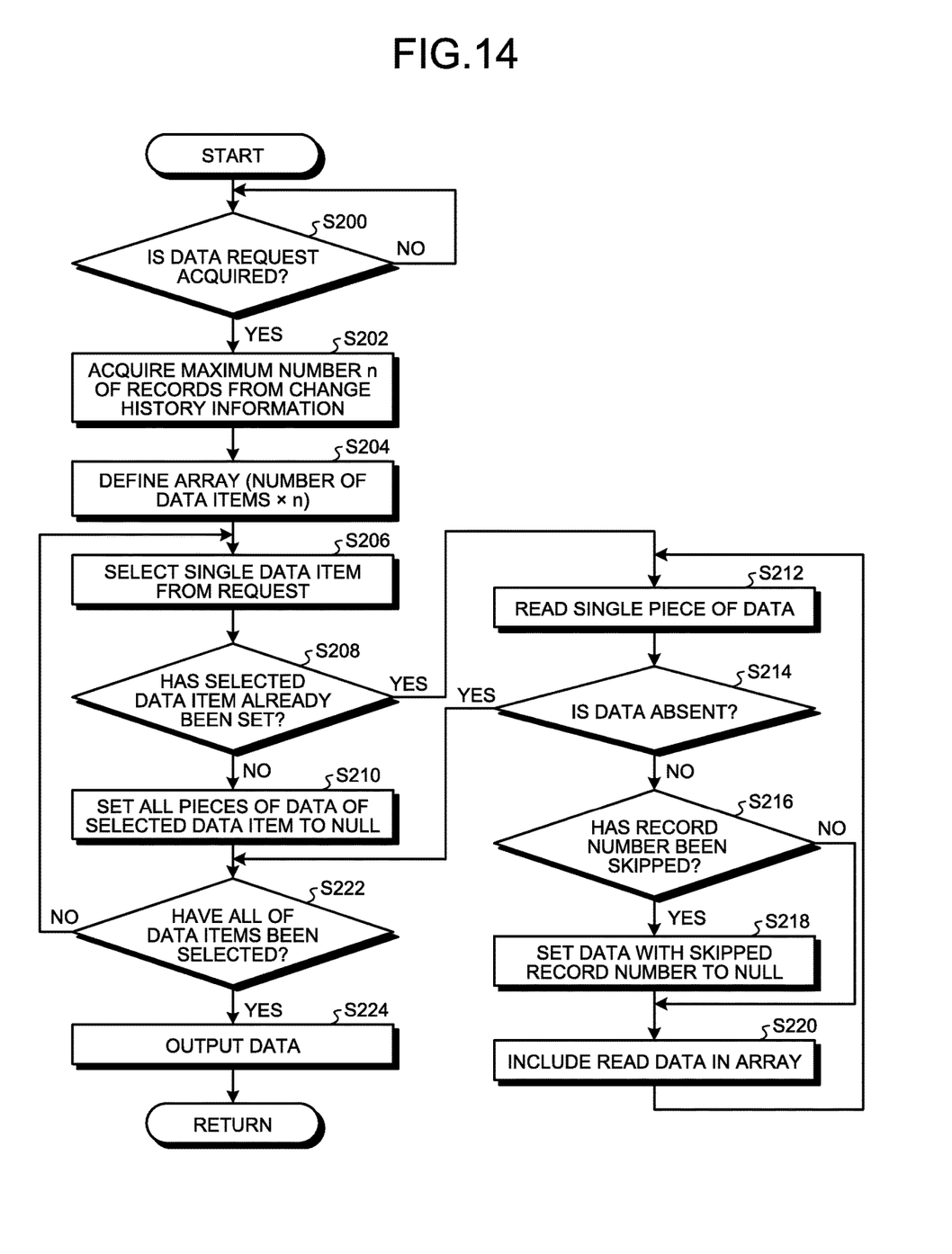
FIG. 14 is a flowchart illustrating an example of the flow of a process performed by the data user interface 120.

FIG. 14 is a flowchart illustrating the flow of a process performed by the data user interface 120. First, the data user interface 120 waits until a data request is acquired (S200). Upon acquiring the data request, the data user interface 120 acquires a maximum number of records at present from schema information 154B (S202). The maximum number is denoted by n. Subsequently, the data user interface 120 defines an array of the number of data items included in the data request×n (S204). This array serves as a frame of output data.

Then, the data user interface 120 selects one of the data items from the data request (S206), and determines whether the selected data item has already been set in the column-oriented data 154A (S208). If the selected data item has not already been set in the column-oriented data 154A, the data user interface 120 sets all pieces of data of the selected data item to null (S210).

In contrast, if the selected data item has already been set in the column-oriented data 154A, the data user interface 120 reads one piece of data of the currently-selected data item from the column-oriented data 154A (S212). Subsequently, the data user interface 120 determines whether data that is readable at S212 is absent (S214). In other words, the data user interface 120 determines whether data that is readable at S212 is not present. If data that is readable at S212 is present (S214: No), the data user interface 120 determines whether a record number has been skipped until the data is read (S216). If the record number has been skipped, the data user interface 120 sets data with the skipped record number to null (S218). Then, the data user interface 120 includes the data that has been read from the column-oriented data 154A, in the array set at S204 (S220).

After the process at S210, or after positive determination is obtained at S214 (S214: Yes), the data user interface 120 determines whether all of the data items have been selected while the process at S206 is repeated (S222). If all of the data items have not been selected, the process returns to S206. In contrast, if all of the data items have been selected, data is output (S224). At this stage, data read from the column-oriented data 154A or null is stored in all pieces of the data in the array.

According to the data management device, the data management method, and the non-transitory computer readable storage medium of the present application, an input record is interpreted and converted to an abstract expression by which a correspondence relation between a data item and data itself can be recognized, and a data set, in which data itself and index information capable of identifying the record are associated with each other, is stored as column data for each data item in the storage unit 150. Therefore, it is possible to use non-structural input data as columnar data, and simply identify the input record.

According to one embodiment of the present application, it is possible to use non-structural input data as columnar data, and simply identify the input record.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data management device comprising:
    a processor programmed to:
        interpret input records by converting each input record to an abstract expression, each abstract expression containing data items and categories and describing relationships between the data items and the categories such that each data item in the abstract expression is associated with a corresponding data category, the abstract expression having a row-oriented data structure so that the data items for each record are arranged in a same row;
    convert each the abstract expression into a column-oriented data structure;
    store each the abstract expression in a column-oriented database,
    wherein, the column-oriented database is arranged such that:
        each column is defined by one of the data categories and contains data items for that category; and
        each data item in each column is associated with an index that identifies the abstract expression from which the data item originated, the data item and index constituting column data for the data item; and
        each abstract expression is processed sequentially and stored so that:
            a new column is created for a data item being processed that has a data category for which a column has not been created and the data item being processed is stored in the new column with its corresponding index value; and
            a data item being processed that has a data category for which a column has already been created is stored in the already created column with its corresponding index value such that each column of the database (i) need not include a data item for every abstract expression, and (ii) can have adjacent entries with non-consecutive index values.

2. The data management device according to claim 1, wherein the processor is programmed to, when the input record includes a hierarchical structure:
    store column data that is based on data in a different hierarchical layers in different memory spaces;
    embed, in upper column data, information indicating a storage location of lower column data; and
    store the record.

3. The data management device according to claim 1, wherein the processor is programmed to reconstruct a single piece of column data with respect to two or more pieces of column data, which are defined by different numerical data formats and which correspond to the same data item, by adopting the data format of the longer numerical data between the data formats at a desired timing.

4. The data management device according to claim 1, further comprising; and
a data user interface that reads at least a data item included in the column data for each of data items that are included in input data.

5. The data management device according to claim 4, wherein when a record does not include a designated data item, the data user interface embeds data, which indicates that corresponding data is absent, as data corresponding to the data item by using an arbitrary format.

6. The data management device according to claim 4, wherein when a designated data item is a data item that is not set as the column data, the data user interface embeds data, which indicates that corresponding data is absent, as all pieces of data corresponding to the data item by using an arbitrary format.

7. The data management device according to claim 4, wherein
the data user interface receives a request to read information capable of identifying a record in which a predetermined data item meets a setting condition, sequentially searches for a data item of a data set that is included in column data of the predetermined data item, and outputs information capable of identifying a record in which the data item meets the setting condition.

8. A data management method implemented by a computer, the method comprising:
interpreting input records by converting each input record to an abstract expression, each abstract expression containing data items and categories and describing relationships between the data items and the categories such that each data item in the abstract expression is associated with a corresponding data category, the abstract expression having a row-oriented data structure so that the data items for each record are arranged in a same row;
converting each abstract expression into a column-oriented data structure;
storing each the abstract expression in a column-oriented database,
wherein, the column-oriented database is arranged such that:
each column is defined by one of the data categories and contains data items for that category; and
each data item in each column is associated with an index that identifies the abstract expression from which the data item originated, the data item and index constituting column data for the data item; and
each abstract expression is processed sequentially and stored so that:
a new column is created for a data item being processed that has a data category for which a column has not been created and the data item being processed is stored in the new column with its corresponding index value; and
a data item being processed that has a data category for which a column has already been created is stored in the already created column with its corresponding index value such that each column of the database (i) need not include a data item for every abstract expression, and (ii) can have adjacent entries with non-consecutive index values.

9. A non-transitory computer readable storage medium having stored therein a computer program that causes a computer to execute:
interpreting input records by converting each input record to an abstract expression, each abstract expression containing data items and categories and describing relationships between the data items and the categories such that each data item in the abstract expression is associated with a corresponding data category, the abstract expression having a row-oriented data structure so that the data items for each record are arranged in a same row;
converting each abstract expression into a column-oriented data structure;
storing each the abstract expression in a column-oriented database,
wherein, the column-oriented database is arranged such that:
each column is defined by one of the data categories and contains data items for that category; and
each data item in each column is associated with an index that identifies the abstract expression from which the data item originated, the data item and index constituting column data for the data item; and
each abstract expression is processed sequentially and stored so that:
a new column is created for a data item being processed that has a data category for which a column has not been created and the data item being processed is stored in the new column with its corresponding index value; and
a data item being processed that has a data category for which a column has already been created is stored in the already created column with its corresponding index value such that each column of the database (i) need not include a data item for every abstract expression, and (ii) can have adjacent entries with non-consecutive index values.

* * * * *